May 24, 1949.  B. N. ASHTON  2,470,800
CONNECTING DEVICE
Original Filed April 14, 1944
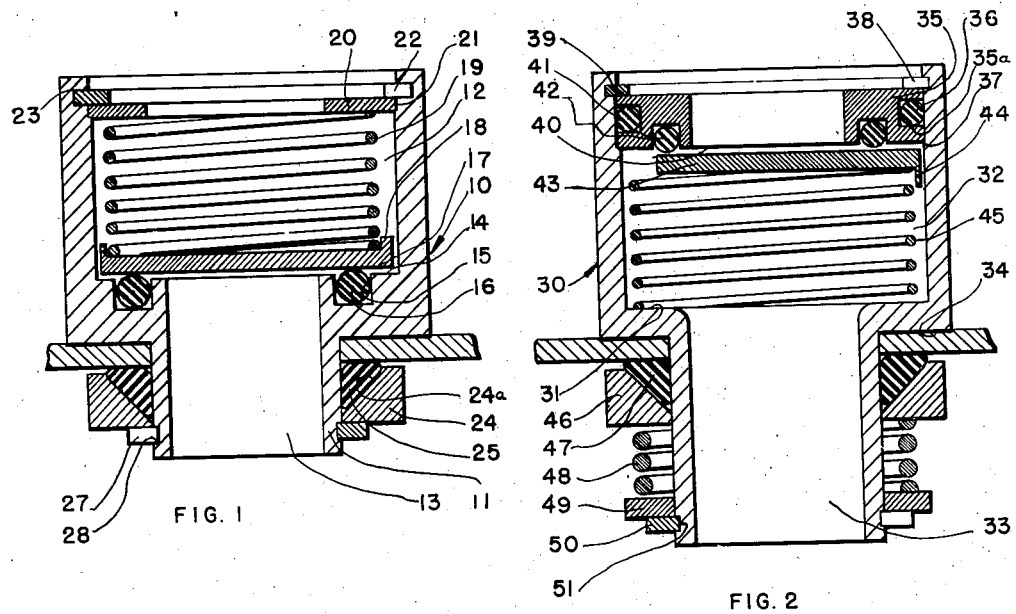
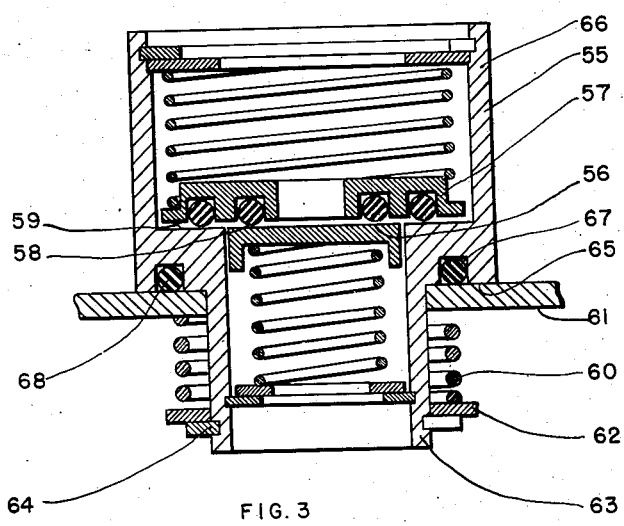
FIG. 3
INVENTOR.
BENJAMIN N. ASHTON
BY
Hoguet, Neary & Campbell
his ATTORNEYS Patented May 24, 1949

2,470,800

UNITED STATES PATENT OFFICE 2,470,800

CONNECTING DEVICE

Benjamin N. Ashton, Kingston, N. Y., assignor to Electrol Incorporated, Kingston, N. Y., a corporation of Delaware Original application April 14, 1944, Serial No. 530,976. Divided and this application April 20, 1945, Serial No. 589,430

6 Claims. (Cl. 285—25)

This invention relates to improvements in coupling devices, and it relates particularly to devices for coupling hollow tubular members such as, for example, valve casings to partitions or walls of casings, conduits and the like.

This is a division of my application Serial No. 530,976, filed April 14, 1944.

An object of the present invention is to provide an improved form of coupling or connecting device by means of which a liquid-tight seal can be obtained between a tubular member and a flat wall of a receptacle or conduit for receiving fluid.

Another object of the invention is to provide a quickly applied or detached coupling for sealing a tubular member such as a valve casing to the wall of a receptacle or a conduit.

Other objects of the invention will become apparent from the following description of typical forms of valves embodying the present invention.

In accordance with the present invention, a typical form of coupling or connecting device may include a resilient ring formed of rubbery material, such as vulcanized rubber, synthetic rubber or a rubbery synthetic resin adapted to encircle a portion of a tubular member and engage a wall of a receptacle or conduit, and a member for urging the rubbery ring into sealing engagement with the tubular member and the wall.

More particularly, the rubbery ring and the member for compressing the rubbery ring are retained on the tubular member and in sealing engagement by means of a snap ring whereby the tubular member may be connected to and disconnected from the wall easily and quickly.

The invention will be described in connection with certain forms of check valves of a type having low inertia and great sensitivity to fluid pressures. The forms of valves disclosed herein include a tubular valve casing and a valve element that consists of a thin plate element of lightweight and simple form that is guided by lateral edge engagement with the valve casing toward and from a valve seat in the casing. The valve seat is provided with a groove in its seating surface for receiving a toroidal ring formed of rubber, synthetic rubber or other similarly resilient material.

The connecting device may be used to support the valve in a boundary wall of a conduit, receptacle or other device in which the valve is required. The preferred type of sealing connector includes a rubbery ring urged against one or both of the tubular casing and the wall adjacent the joint therebetween by means of a ring having a tapered inner surface which compresses the rubbery ring into tight sealing engagement with the elements and is retained in such position by a snap ring or other means.

For a better understanding of the present invention, reference may be had to the accompanying drawings, in which:

Figure 1 is a view in section of a typical form of check valve illustrating a construction embodying the present invention for mounting the check valve in a wall of or in a conduit or other fluid receptacle;

Figure 2 is a view in section of a different form of check valve illustrating also a modified means for connecting and sealing the check valve to a wall; and Figure 3 is a view in section of a still different type of pressure-responsive valve including still another type of connecting device embodying the present invention.

The form of check valve illustrated in Figure 1 of the drawings includes a generally cylindrical, tubular casing 10 having a reduced cylindrical, tubular portion 11 at one end thereof. The cylindrical casing 10 is provided with an enlarged cylindrical cavity or bore 12 therein and the portion 11 of the casing is provided with a smaller bore 13 therein defining with the bore 12 a shoulder 14 disposed about midway of the casing 10 and 11 and lying in a plane normal to the axis of the casing 10.

The shoulder 14 forms the seat of the check valve and is provided with an annular groove 15 therein facing axially of the casing 10. Mounted within the groove 15 is an annular or toroidal rubbery ring 16 formed of natural or synthetic rubber or similar rubbery material which is of sufficient cross-sectional diameter to project slightly above the seat 14.

Cooperating with the seat 14 and the ring 16 is a valve element 17 which is generally square in shape. This valve element 17 may be formed of square bar stock, such as steel, aluminum or other material by sawing off a section of the bar stock and machining its center to leave at the corners upstanding guide members 18. These guide members extend along the walls of the casing 10 and tend to prevent tilting or cocking of the valve element 17 in the bore. Corners of the bar stock may be ground off in order to provide a fairly close fit of the valve element 17 in the bore 12.

The valve element 17 is normally urged into engagement with the ring 16 by means of a coil spring 19 which is disposed within the guiding elements 18 and positioned thereby. The spring is of such design that upper and lower coils thereof are parallel. Such a spring normally tends to prevent the valve element 17 from tilting in the casing 10.

The spring is maintained under a desired compressive stress by means of an annular ring 20 which is dropped into the open end of the casing 10 and abuts a shoulder 21 therein parallel to the valve seat 14. The annular ring 20 in turn is retained in position by means of a split snap ring 22 that is normally expanded into a groove 23 in the valve casing 10.

When the valve element 17 is subjected only to the pressure exerted by the spring 19, it rests against the rubber ring 16. When fluid pressure is applied to the upper surface of the valve element 17, as viewed in Figure 1, the valve element is urged downwardly more strongly against the ring 16, compressing it until the valve element engages the seat 14 inside and outside the ring 16. As the pressure increases, the rubber ring is distorted by the fluid pressure exerted thereon, squeezing it more tightly into engagement with the valve element 17, the seat and the inner wall of the groove 15, with the result that an effective fluid seal is obtained under all pressure conditions. Resistance to leakage under fluid pressures exerted in the bore 12 is limited only by the strength of the valve element 17 and its resistance to breakage.

When the valve element 17 is subjected to fluid pressure in the bore 13, the valve element is easily displaced, depending principally upon the strength of the spring 19. By selecting a suitable light spring 19 and forming the valve element 17 of lightweight material, the valve element can be displaced by fluid pressures as small as one-quarter ounce per square inch, thereby indicating the sensitivity of such a valve element.

In accordance with the present invention, a check valve of the type described above can be readily positioned and sealed to a wall of or in a conduit or a receptacle by means of the connector structure disclosed in Figure 1. This connector includes an annular ring 24 formed of metal or other suitable material having a conical inner face 24a. The conical inner face engages a rubbery ring 25 interposed between the casing section 11 and the wall 26. When the ring 24 is forced against the rubbery ring 25, it is distorted into a somewhat triangular shape, effecting a tight seal with both the wall 26 and the casing section 11 and preventing leakage therebetween. The ring 24 may be retained in position by means of a snap ring 27 which is received in a groove 28 in the casing section 11.

For some purposes it may be desirable to reverse the direction of opening of the check valve from that shown in Figure 1. A suitable check valve for this purpose is illustrated in Figure 3. This device includes a casing 30 similar to the casing 10, 11 described above and having an internal shoulder 31 between the bores 32 and 33 therein and an external shoulder 34.

The valve seat for this form of check valve may consist of an annular ring 35 having a peripheral groove 35a therein for receiving a sealing ring 36 which normally engages the inner wall of the casing 30. The ring 35 rests upon a narrow annular shoulder 37 in the casing to prevent it from dropping downwardly in the casing. Outward movement of the ring 34 is prevented by means of a split snap ring 38 engaging in a groove 39 in the upper portion of the casing 30. The undersurface of seat portion 40 of the ring 34 is provided with an annular groove 41 in which is mounted the sealing ring 42. The valve seat 40 and the ring 42 cooperate with a valve element 43 which may be formed of a triangular piece of bar stock. While a triangular element is shown, it will be understood that a square valve element or other noncircular shape may be used. This valve element 43 has guide flanges 44 at its corners formed by milling out the center of the piece. A spring 45 is interposed between the shoulder 31 of the casing 30 and the lower surface of the valve element 43 and is disposed within the guide flanges 44 to guide the valve element 43 in its movements toward and away from the seat 40.

In accordance with the present invention, this device may be provided with a connector including the annular ring 46 having a tapered inner surface, a rubbery ring 47 and a coil spring 48 for urging the rings 46 and 47 into proper sealing engagement with the elements. The advantage of using a spring 48 in this combination is that the valve may be readily fitted to walls of varying thickness. The spring 48 is retained under compression by means of a retaining ring 49 slidably mounted on the casing 30 and a snap ring 50 which engages in a groove 51 near the lower end of the casing 30.

Another type of connector is illustrated in Figure 3. This connector is illustrated as applied to a double-acting, pressure-responsive valve having a tubular casing 55 and cooperating valves 56 and 57 and valve seat elements 58 and 59. This connector construction consists of a spring 60 which bears against the wall 61 of a casing, receptacle or conduit and a ring 62 carried by the reduced section 63 of the casing and retained thereon by means of the snap ring 64. The shoulder 65 between the enlarged portion 66 of the valve casing and the smaller portion 63 of the casing 55 is provided with an annular groove 67 for receiving a rubbery sealing ring 68 that engages the wall 61 and provides a seal between the casing 55 and the wall 61.

While the above described connectors or couplings are illustrative of the invention, it will be understood that they can be modified considerably. Therefore, the forms of the invention shown in the drawings should be considered as illustrative, only, and not as limiting the scope of the following claims.

I claim:

1. A device for connecting a tubular member in liquid-tight relationship to a wall of a receptacle, said member having a shoulder engageable with said wall and a reduced portion adapted to extend through an aperture in said wall, comprising a toroidal rubbery ring encircling a portion of said tubular member adjacent to said wall, and detachable resilient means for compressing said ring against said tubular member and said wall and retaining said shoulder in engagement with said wall.

2. A device for connecting to a wall a tubular member having a passage therethrough and an external shoulder having a surface engageable with said wall, comprising a ring having a tapered inner surface detachably mounted on said tubular member and forming therewith a tapered annular recess opposing said annular face, a rubbery ring of circular cross-section in said recess between said shoulder and said tapered inner surface for compression into sealing engagement with said wall and said tubular member.

3. A device for connecting valve casings and the like to the walls of fluid receptacles comprising a casing having a portion adapted to extend through a hole in said wall, a shoulder on said casing adapted to engage a surface of said wall, a rubbery toroidal ring encircling said casing portion on the opposite side of said wall from said surface, a rigid ring having a tapered inner surface engageable with said rubbery ring to compress it against said wall and said casing portion and deforming the ring into substantially triangular cross-sectional shape, and means for detachably retaining said rigid ring on said casing portion.

4. The device set forth in claim 3 in which said detachable retaining means comprises a groove in said portion and a snap ring engageable in said groove and with said rigid ring.

5. The device set forth in claim 3 in which said detachable retaining means comprises a spring encircling said portion and engaging said rigid ring, and a detachable snap ring mounted in said portion for retaining said spring under compression.

6. A device for connecting a tubular member in liquid-tight relationship to a wall of a receptacle, said member having a reduced portion adapted to extend through an aperture in said wall and a shoulder provided with an annular face engageable with said wall, comprising means forming an annular groove in said shoulder around the axis of said tubular member, a toroidal rubbery ring in and projecting slightly from said groove, and detachable spring means on said reduced portion on the opposite side of said wall from said shoulder for compressing said ring against said wall and retaining said shoulder in engagement with said wall.

BENJAMIN N. ASHTON.

REFERENCES CITED

The following references are of record in the file of this patent:

UNITED STATES PATENTS

| Number | Name | Date |
| --- | --- | --- |
| 392,931 | Prindle | Nov. 13, 1888 |
| 874,652 | Bailey | Dec. 24, 1907 |
| 1,659,094 | Godfrey | Feb. 14, 1928 |
| 1,750,257 | Bonnell | Mar. 11, 1930 |
| 1,981,247 | Pope | Nov. 20, 1934 |